Nov. 24, 1970

B. E. DAVIS ET AL 3,541,837

CALIBRATING BARREL

Filed June 13, 1968

INVENTORS.
BILLY E. DAVIS
PAUL V. GILLIAM

BY

*Head & Johnson*

ATTORNEYS

INVENTORS.
BILLY E. DAVIS
PAUL V. GILLIAM
BY
*Head & Johnson*
ATTORNEYS

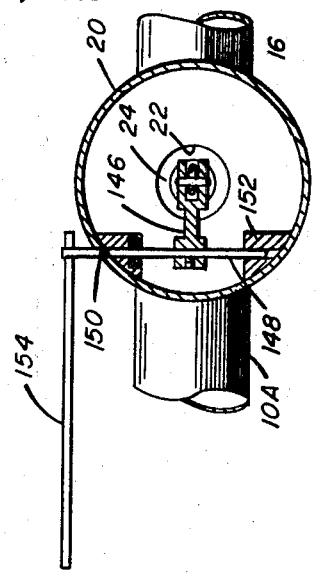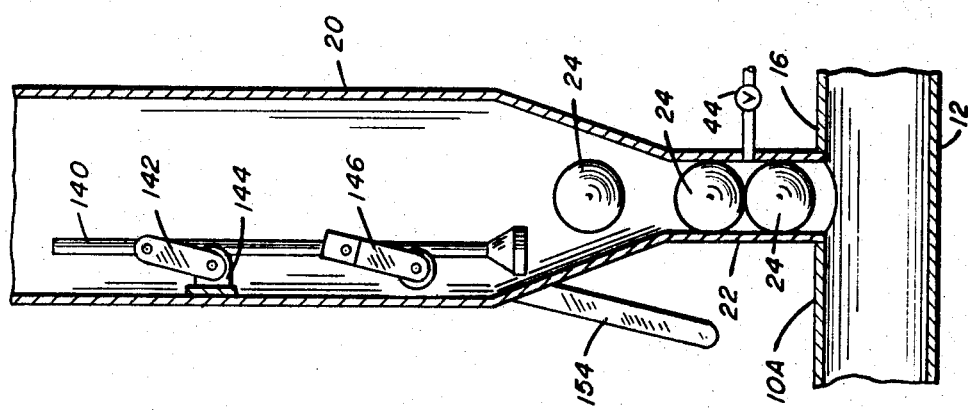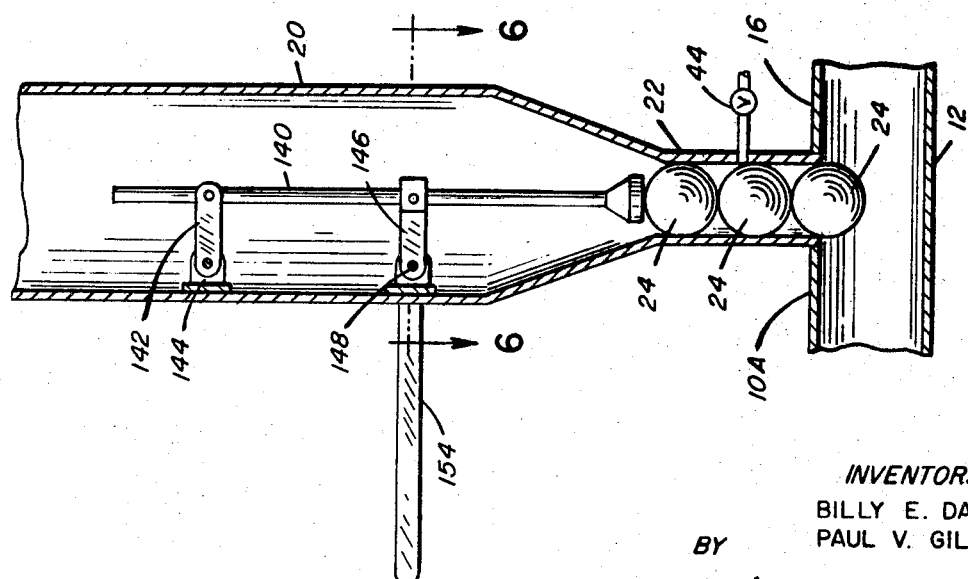

United States Patent Office 3,541,837
Patented Nov. 24, 1970

1

3,541,837
CALIBRATING BARREL
Billy E. Davis, Tulsa, and Paul V. Gilliam, Broken Arrow,
Okla., assignors to Signet Controls, Inc., Tulsa, Okla.,
a corporation of Oklahoma
Filed June 13, 1968, Ser. No. 736,752
Int. Cl. G01f 25/00
U.S. Cl. 73—3                                         8 Claims

ABSTRACT OF THE DISCLOSURE

Fluid flow meters are calibrated by comparing the flow meter through a calibration barrel. The barrel is of uniform internal diameter with two detector switches placed a predetermined distance apart. Balls with a diameter substantially equal to the internal diameter of the barrel move the predetermined distance to actuate the switches so that an exact and predetermined amount of fluid flow is detected. A ball return conduit is connected to the inlet and outlet ends of the calibration barrel so that a ball is returned from the outlet to the inlet for another calibration test.

CROSS-REFERENCES

This application is not related to any pending United States or foreign applications.

BACKGROUND AND SUMMARY OF THE INVENTION

This invention relates to the art of calibrating fluid flow meters. For many years in the petroleum industry crude oil produced in the field was conveyed by pipelines to storage tanks. Such storage tanks also served as metering tanks with the crude oil being delivered to the purchaser by measurements made according to the depth of crude oil in the tanks. This required a gauger to record the depth, switch the necessary valves to transfer the crude oil, and so forth.

In recent years a trend has developed towards the use of meters as a means of measuring the quantity of crude oil that is produced on an oil lease and conveyed to a pipeline. Since the value of crude oil is high and large quantities are involved, the accuracy of the meters by which the crude oil is measured is extremely important. A small percentage of meter inaccuracy can, in a relatively short time, result in a substantial dollar amount of over or under payment for crude oil delivered.

For these reasons it has become important to provide means of accurately calibrating meters. It is particularly important that means be provided wherein calibration can be accomplished without taking the meters out of the environment in which they are used.

In order to gain a broader understanding of the background of this invention to acquire a better knowledge of the importance of meter provers and to gain an indication of the efforts of others to fulfill this need, reference may be had to the following United States patents: 2,772,561; 3,021,703; 3,120,118; 3,273,375; and 3,295,357. This list is not intended to be exhaustive but is merely indicative of various other types of meter provers which have been devised.

In each of these prior United States patents meter calibration is accomplished by moving a piston, whether in the form of a cylindrical device or a ball, in a barrel of uniform internal diameter. Each of the devices taught in these patents function on the principal that a precise and predetermined amount of fluid flow is required to move a piston within a barrel between spaced points. Fluid is passed through the meter being calibrated and through the calibrating barrel, affording means of a com-

2 parison of the meter indication during the time of the passage of the piston from one point to another in the barrel. This arrangement has proven exceedingly satisfactory and is the premise upon which the present invention is founded.

One of the problems which has been encountered in the type of calibrating barrel or piston prover represented by these patents is that of switching the fluid flow so as to pass fluid through the barrel during calibration procedures. In each of the prior instances, and in all known applications of calibrating barrel type meter provers utilized to date, some valving arrangement is required to switch the fluid flow to pass the flow through the calibrating barrel during proving of the meter, and to bypass the calibrating barrel during other times when the meter is not being proved. These valving arrangements consist generally of manifolding a plurality of valves or utilizing a single multiport valve. In either instance the expense of valving constitutes a substantial portion of the expense of providing a meter prover. In addition, in order to assure the absolute accuracy of the provers it is unequivocally required that such valving systems have no leakage whatsoever. Thus the quality of valves utilized must be high, further increasing the expense of such valving arrangements.

This invention provides a calibrating barrel particularly useful in proving meters which is uniquely characterized in that it obviates the necessity for a fluid switching valving arrangement.

It is therefore a general object of this invention to provide an improved calibrating barrel of the type useful in calibrating meters.

A more particular object of this invention is to provide an improved calibrating barrel arranged in such a manner that no valving is required to switch fluid flow or to provide for bypass of ball members during meter calibration.

These and other objects will be apparent from the following description and claims.

DESCRIPTION OF THE VIEWS

FIGS. 2A is a cross-sectional view taken along the line 2A—2A of FIG. 2 showing details of the ball launching arrangement.

FIG. 2B is a cross-sectional view taken along the line 2B—2B of FIG. 2 showing further details of the ball launching mechanism of the arrangement of FIG. 2.

FIG. 4 is a cross-sectional view of a portion of the invention showing a still different alternate arrangement for launching balls into the calibrating barrel.

FIG. 5 is a cross-sectional view as shown in FIG. 4 showing the operating mechanism in a different position.

FIG. 6 is a cross-sectional view taken along the lines 6—6 of FIG. 4.

DETAILED DESCRIPTION

Figure 1:
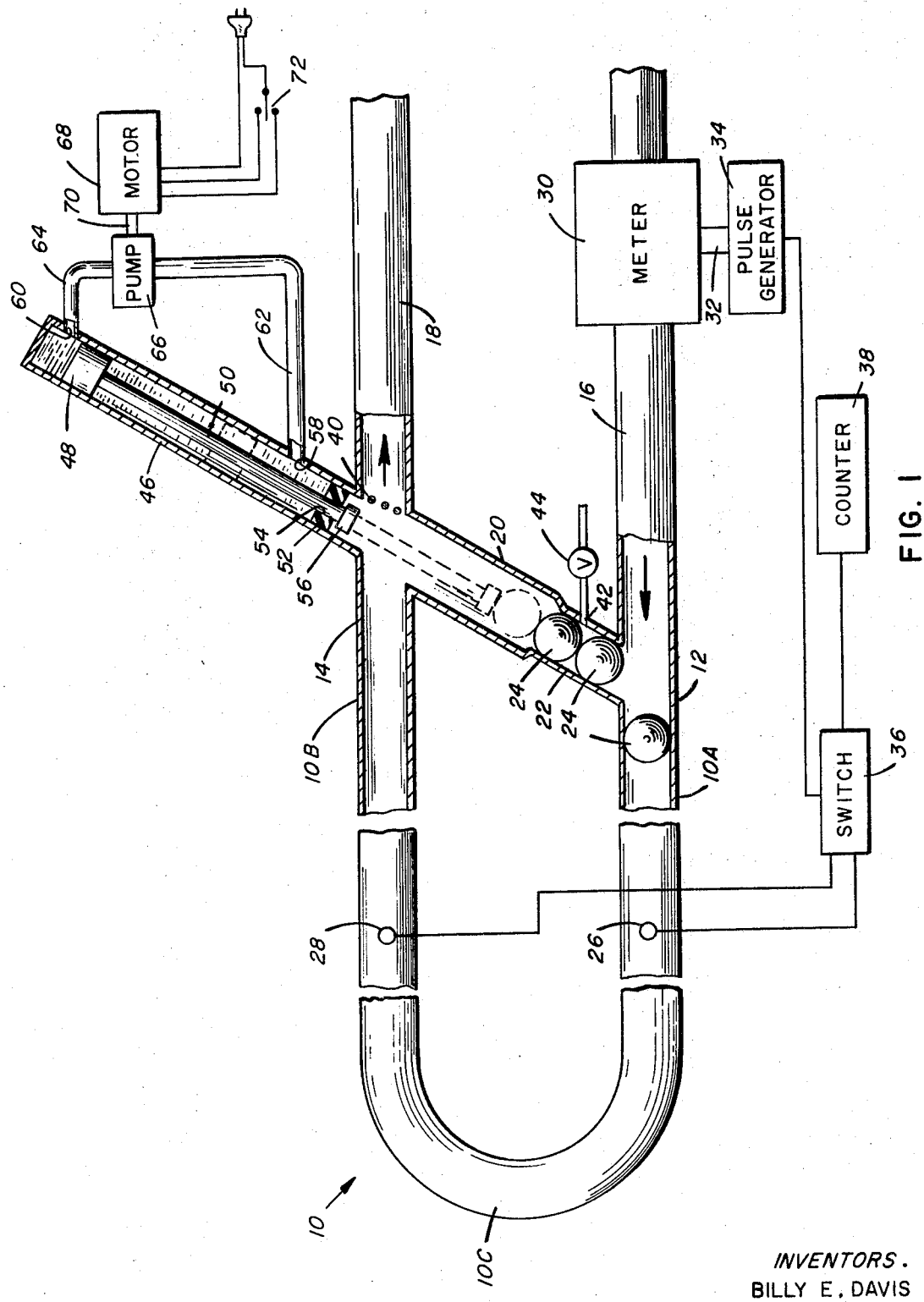
FIG. 1 is a side view, shown particularly in cross-section, of a calibrating barrel according to this invention.

Referring first to FIG. 1, one embodiment of the invention is shown. The invention includes a calibrating barrel generally indicated by the numeral 10. The barrel 10 includes three basic major portions, that is, a first leg portion 10A, a second and paralleled leg portion 10B, and a U-shaped intermediate portion 10C. It is understood that the invention is not necessarily limited to such U-shaped arrangements as illustrated, however, such arrangements are highly preferred for reasons which will become obvious as the description proceeds. The calibrating barrel 10 includes an inlet portion 12 and an outlet portion 14. As illustrated, the calibrating apparatus may include additional inlet piping 16 and outlet piping 18 extending from the leg portions 10A and 10B respectively.

Extending between the barrel legs 10A and 10B and communicating at one end with the barrel adjacent the inlet 12 at the other end with the barrel adjacent the outlet 14 is a ball return conduit 20. The ball return conduit 20 includes a reduced internal diameter portion 22 in the portioner thereof adjacent the barrel inlet 12.

There is utilized as a portion of the calibrating barrel of this invention a plurality of ball members 24. The invention requires the use of at least two of the ball members 24 but the preferred arrangement includes the use, as illustrated, of at least three of the ball members. While more than three of the ball members 24 may be utilized such additional number is not normally necessary nor desirable.

Ball members 24 are of a diameter substantially equal the internal diameter of the calibrating barrel 10. Typically, ball members 24 are hollow spheres of rubber filled with a liquid so that the total weight of each of the balls 24 is slightly greater than the weight of the fluid they displace. Balls 24 are adapted to be moved sealably within the interior of barrel 10 by the flow of fluid therethrough and ideally flow through the length of the barrel without any leakage of fluid past the balls during the total path of travel through the barrel.

Affixed to the calibrating barrel is a first detector switch 26 and a second detector switch 28. The switches 26 and 28 are spaced apart from each other and intermediate the inlet 12 and outlet 14 of the barrel. Switches 26 and 28 are adapted to be actuated by the passage of a ball 24. Typically switches 26 and 28 include a member projecting inwardly of the interior circumferential surface of the barrel 10, the projection being pushed outwardly by the passage of a ball, such outward push serving to actuate a switch mechanism. Barrel 10 is of uniform internal diameter between detector switches 26 and 28.

In series with the inlet piping 16 is the meter 30 which is to be calibrated by the apparatus of this invention, it being understood that the meter could be equally as well in series with the outlet piping 18. Extending from the meter 30 is a shaft 32 driven by the meter which in turn drives a pulse generator 34. The function of pulse generator 34 is to generate a sequence of electrical pulses in consonance with the quantity of the fluid flowing through the meter 30. A switch means 36 is provided in conection with the pulse generator 34 and the detector switches 26 and 28. Connected to the switch 36, in addition, is a pulse counter 38.

During calibration of meter 30 a ball 24 passing the first detector 26 actuates switch 36 to communicate the electric pulse output of generator 34 to counter 38, wherein the pulses are counted. Upon the arrival of a ball 24 at the second detector switch 28 the switch 36 is actuated to terminate the accumulation of electrical pulses by counter 38 so, thus counter 38 accumulates the pulse generation caused by the flow of fluid necessary to move a ball from switch detector 26 to switch detector 28. Since this is always a precisely predetermined volume, the total pulse counter registered by counter 38 may be utilized as an indication of the accuracy of the meter. It is understood that the particular type of calibrating system utilizing pulse generator 34, switch 36, and counter 38, is not claimed to be novel per se apart from the use thereof in combination with the calibrating barrel of this invention.

Thus, it can be seen that when it is necessary to calibrate meter 34 all that is required is that a ball 24 be inserted into the inlet 12 of calibrating barrel 10. Other than during actual calibration of meter 30, each of the balls 24 is retained within the ball return conduit 20 providing free and unobstructed flow of fluid through the calibrating barrel. As a ball 24 reaches the barrel outlet 14 it is prevented from passing into the outlet piping 18 by a ball diverting means 40 which, in FIG. 1, is illustrated as including three bar members extending across the interior of the outlet piping 18, it being understood that only one of such bar members would be required to prevent a ball 24 from passing into the outlet piping 18.

As each of the ball members 24 passes outlet 14 it moves into the ball return conduit 20 where it remains until it is again injected into the inlet of barrel 10. As has been previously stated, in the preferred arrangement three balls 24 are utilized, as illustrated, so that when one of the balls is injected into the inlet 12 two of the balls remain in the reduced internal diameter portion 22 of the ball return conduit 20. Balls 24 snugly and sealably fit within the reduced internal diameter portion 22 and prevent flow of fluid therethrough. Thus, the balls 24 remaining in the ball return conduit insure that all fluid flowing through the meter 30 and inlet piping 16 passes only through the length of the calibrating barrel 10 to reach outlet piping 18 and none is permitted to bypass the calibrating barrel through the ball return conduit.

As a means of insuring that no fluid flow is occurring during calibration, a small opening 42 is provided in the ball return conduit 20 in the reduced internal diameter portion 22 and at a point between the positions occupied by balls 24. A small valve 44 is connected to opening 42. It can be seen that as long as two balls 24 are within the reduced internal diameter portion 22 and that if each are completely sealing such reduced internal diameter portions, no fluid flow can occur between the balls. Thus, to determine the completeness of the seal formed by the balls 24, valve 44 may be opened during the calibration of a meter. When valve 44 is first open there may be a slight fluid flow as the pressure in the area between the balls is equalized with atmospheric pressure. Subsequently if both balls are completely sealing no fluid pressure exists at opening 42 and therefore no fluid discharge will occur through valve 44. Thus the valve 44 provides a simple and effective means of insuring the complete integrity of the sealing of the ball return conduit 20.

Illustrated in FIG. 1 is one means of launching a ball 24 into the inlet of calibrating barrel 10 when it is desired to calibrate meter 30. The illustrated means includes a cylinder 46 having an open end communicating with barrel 10 adjacent the outlet 14, the cylinder 46 extending coaxially with the ball return conduit 20. Within the cylinder 46 is a slidable piston 48. Affixed to the piston 48 and extending coaxialy within the cylinder 46 is a piston rod 50. Closing the end of the cylinder 46 adjacent the calibrating barrel is a packing bushing 52 having an opening 54 therein which slidably receives piston rod 50. On the end of piston rod 50 exterior of the packing bushing 52 is a ball engaged portion 56.

An opening 58 is provided in cylinder 46 below said piston and an opening 60 is provided above said piston. Communicating with openings 58 and 60 are conduits 62 and 64 extending to the hydraulic pump 66. A reversible electric motor 68 drives pump 66 by means of shaft 70. With motor 68 energized by means of switch 72 to turn pump 68 in one direction, fluid is drawn inwardly through openings 58 and discharged by the pump through opening 60. This causes a greater pressure above the piston 48 than below it and thereby the piston 48 is forced downwardly, moving the piston rod 52 into the ball return conduit 20. The piston rod moves downwardly and engages a ball 24 and forces it, and the other balls below it, downwardly. With three balls in series within the interior of the ball return conduit 20, the piston rod 50 may be caused to extend downwardly sufficient to force all the balls downwardly equivalent to one diameter of a ball, thereby pushing one of the balls 24 into the inlet of the barrel 10. From this point onward, the ball 24 is carried by fluid flow through the barrel until it passes back into the ball return conduit.

After a ball has been injected into the inlet of barrel 10 switch 72 may be reversed, reversing the pumping direction of pump 62 and forcing fluid out through conduit 62 into the interior of the cylinder below piston 48. This reverses the direction of travel in the piston and withdraws the piston rod 50, permitting the launched ball, when it returns, to pass freely downwardly into the ball return conduit.

Figure 2:
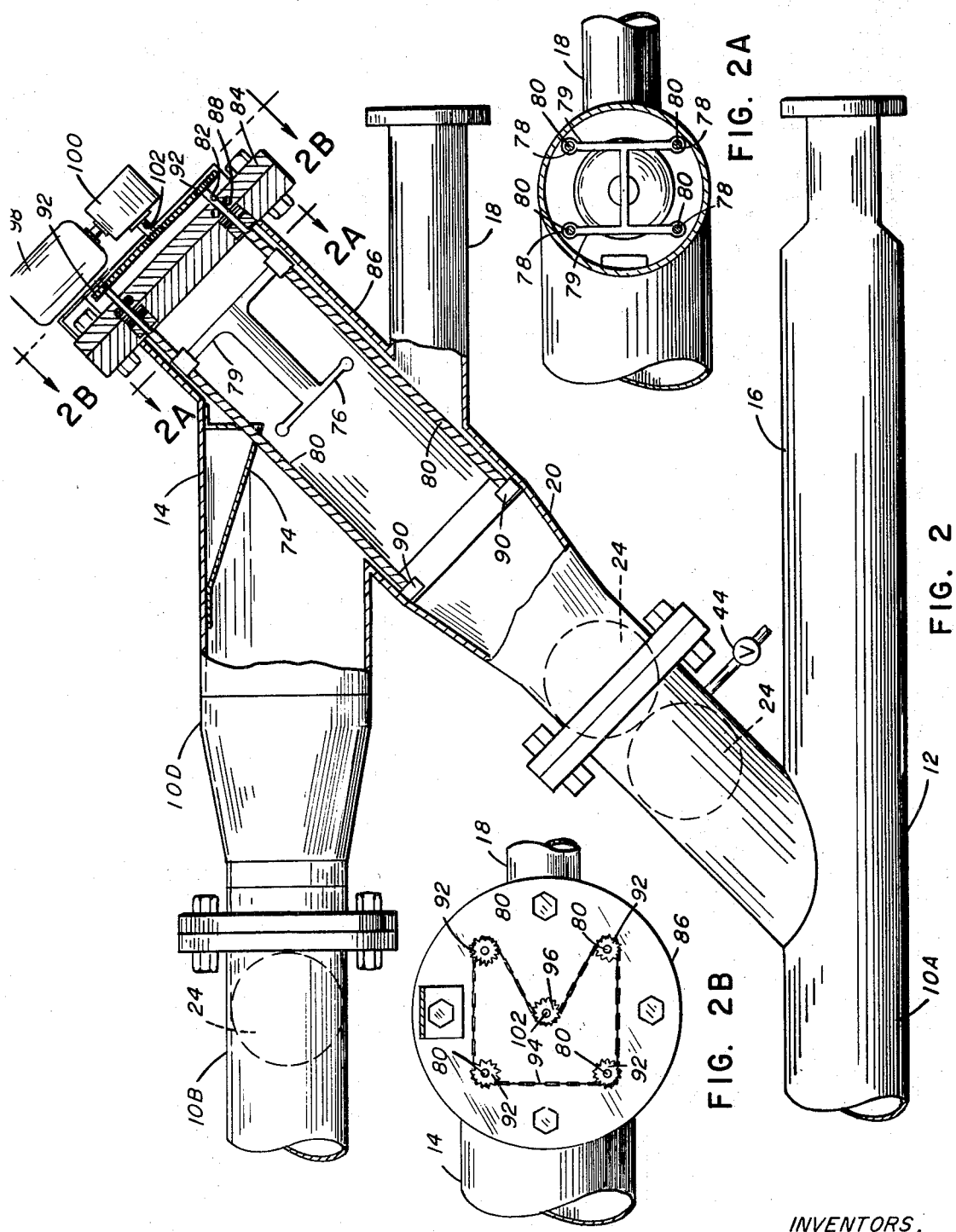
FIG. 2 is a side view, shown particularly in cross-section, in somewhat greater detail of a portion of a calibrating barrel according to this invention, including one means of launching balls into the barrel.

FIGS. 2, 2A and 2B show an alternate arrangement of the invention, particularly as it relates to a method of launching a sphere to initiate a calibration cycle. In this alternate embodiment the U-shaped intermediate portion of the calibrating barrel is not shown. The leg portion 10B terminates in an enlarged end portion 10B. Due to the increased cross-sectional area of the enlarged end portion 10D the velocity of fluid flow is decreased compared to the velocity in the constant internal diameter portion of the barrel. The reduced fluid velocity slows the speed of ball travel and permits it to make the transition into the ball return conduit 20 more easily.

To move the ball downwardly towards the return conduit 20 an inclined diverter 74 is provided. In the arrangement of FIG. 2, a ball engaging follower 76 is provided having threaded openings 78 (see FIG. 2A). In the illustrated arrangement the ball engaging member 76 includes arm 79 having enlarged outer extremities thereof for openings 78. Rotatably supported within the upper portion of the ball return condit 20, which portion may be termed a launch chamber 86, are externally threaded elongated screw members 80, each received by a threaded opening 78. Each of the screw members 80 extend through an opening 82 in the outer end plate 84 of the launch chamber 86. The portions of the screw members 80 extending through openings 82 in outer end plate 84 are non-threaded. Seals 88 are provided in openings 82 to prevent leakage. The lower end of each of the screw members 80 is rotatably supported by bearing block 90. Affixed to the outer ends of each of the screw members 80, exterior of the end plate 84, is a sprocket 92 (see FIG 2B). Extending around a portion of the periphery of each of the sprockets 92 is a chain 94 which also extends around a portion of the periphery of a driven sprocket 96. Supported to the launch chamber end plate 84 is a motor 98 and gear drive 100 having an output shaft 102. Drive sprocket 96 is affixed to and is driven by the output shaft 102.

When motor 98 is energized rotating output shaft 102 chain 94 is driven which in turn rotates each of the sprockets 92 and shafts 80. The rotation of threaded shafts 80 moves the ball engaging folower 76 downwardly to engage a ball 24 and push one of such balls into the inlet portion 12 of the calibrating barrel 10. After a ball has been forced into the inlet portion of the barrel the direction of rotation of motor 78 may then be reversed electricaly to rotate shaft 102, sprockets 92 and 96, and thereby shafts 80 in the opposite direction to withdraw the ball engaging follower 76 to its nonactuated position as shown in FIG. 2. In this position the follower is out of the way and does not interfere with passage of fluid or a ball as it is moved by the fluid out of the barrel and into the launch chamber and ball return conduit 20.

In the illustrations of FIGS. 2, 2A and 2B the arrangement is shown wherein four externally threaded screw members 80 are utilized, the ball passing between two of the spaced screw members as it passes from the barrel outlet portion 14 into the launch chamber 86. It can be seen that an alternate arangement incorporating the same principles would include the use of two of such members spaced on a diameter of the launch chamber 26 in a plane perpendicular the axis of the barrel 10.

In the arrangement of FIG. 2 it is apparent that the lower end of the ball engaging followers 76 need travel only a sufficient distance so that with three balls 24 in the ball return conduit 22 downward engagement with the top ball will cause the lowermost ball to be pushed into the calibrating barrel inlet 12.

Although not shown, an obvious improvement is the provision of limit switches to automatically reverse the direction of motor 78 when the ball engaging follower 76 has reached its downward-most position and thereby automatically return it to the rest position. Other innovations will be apparent, including many alternate arrangements of utilizing a ball engaging follower, rotatable threaded screw members, and means for the rotation thereof to move a ball follower into engagement with and for launching balls, all within the purview of this invention.

Figure 3:
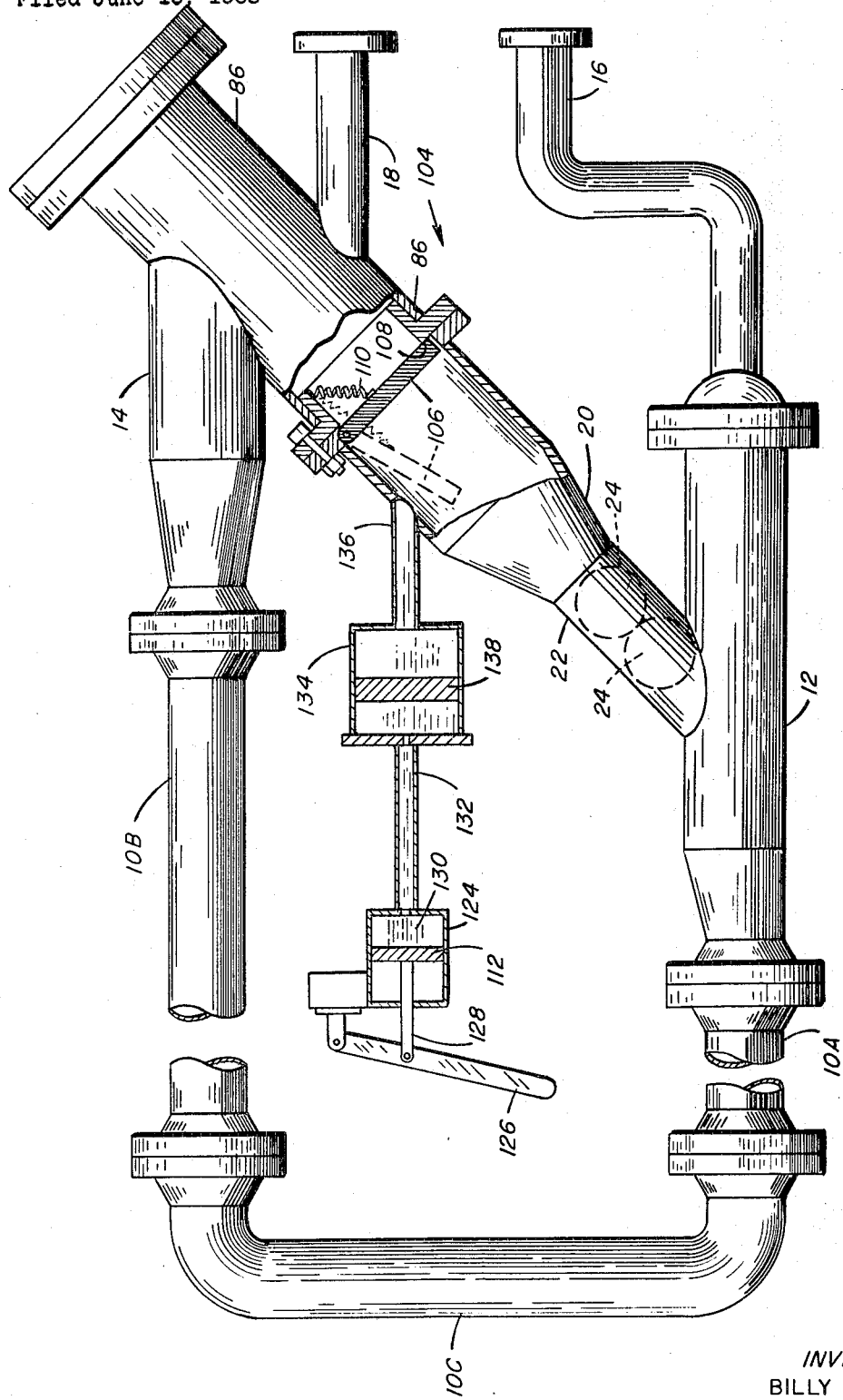
FIG. 3 is an elevational view, shown partially in cross-section, of an additional alternate arrangement of the invention and particularly an alternate means of launching balls into the calibrating barrel.

FIG. 3 shown an additional alternate arrangement for launching spheres 24. In the launch chamber 86 there is provided a check valve generally indicated by the numeral 104. Basically the check valve includes a hinged clapper portion 106 which, in its closed position, seats against a seat 108. A spring 110 normally retains the clapper 106 in closed position as shown. When a sphere passes out of the calibrating barrel outlet 14 and into launch chamber 86, the weight of the sphere is such that it moves downwardly against the clapper 106 and pushes it into the open position, the ball consequently passes downwardly into the ball return conduit 20. After the passage of a ball, spring 110 returns the clapper 106 to closed position.

With balls 24 in the reduced internal diameter portion 22 of the ball return conduit 20 the area between such balls and the clapper 106 is a closed, sealed area. Thus, when it is necessary to inject a ball 24 into the inlet 12 of the calibrating barrel, it is necessary only to increase the quantity of fluid trapped between the balls in the reduced internal diameter portion 22 and the clapper 106. This is accomplished, in the illustrated arrangement, by the forward motion of a piston 112 in a cylinder 124. Such forward motion can be accomplished by any type of mechanical arrangement such as the manual use of a lever 126 connected to piston rod 128. When piston 112 is moved forward in cylinder 124, fluid 130 is moved out of the cylinder and by means of conduit 132 may be moved directly into the confined area between balls 24 and clapper 106, thus to force the balls 24 downwardly a distance so as to force the lowermost ball into the inlet of the calibrating barrel.

The arrangement of FIG. 3 provides, as a further refinement, a means of preventing the commingling of the fluid 130 in cylinder 124 with the fluid passing through the calibrating apparatus. This is accomplished by means of a cylinder 134 having an opening at each end thereof, one of the openings receiving conduit 132 and the other receiving conduit 136. Within the cylinder 134 is a piston 138 which is free to slide sealably within the cylinder. Thus, the piston 138 permits the pressure to either side thereof to be equalized without permitting commingling of fluids. In this arrangement, when lever 126 is pushed forward, fluid 130 is moved through conduit 132 into the cylinder 134, displacing piston 138. Piston 138 is moved forward displacing fluid to the right of it forcing such fluid through conduit 136 into the confined area within ball returned conduit 20 and launch chamber 86. When lever 126 is moved in the reverse direction fluid is withdrawn through conduit 132 causing piston 138 to move rearwardly as the pressure is equalized so that the system will be in condition for the next delivery of a ball into the barrel.

It can be seen that an alternate arrangement includes the direct movement of piston 138 through mechanical arrangement rather than through a hydraulic arrangement. In addition, free piston 138 may include a folded diaphragm arrangement within cylinder 134. Various reservoir arrangements may also be utilized in connection with the hydraulic system.

Referring to FIGS. 4, 5 and 6, still another alternate arrangement for launching spheres according to this invention is shown. Positioned within the ball return conduit 20 is a plunger member 140 arranged to be pivoted in such a way as to always remain parallel to the axis of the ball return conduit. An upper arm 142 is pivotally supported at one end to a bracket 144 affixed to the inside of the ball return conduit 20 and at the other end to plunger member 140. Paralleling the upper bracket 42 is a lower arm 146 which has the outer end thereof pivoted to the plunger member 140. The inner end of the lower arm 146 is affixed to a horizontal shaft 148, best seen in FIG. 6. Shaft 148 extends in a plane perpendicular the longitudinal axis of the ball return conduit 20 and extends partially exteriorly of the conduit through a sealed opening 150. The other end of the shaft 148 is rotatably supported by a bearing block 152 affixed to the interior of the conduit 20.

Extending normal to the shaft 148 exterior to the conduit 20 is a lever arm 154.

FIG. 5 shows the device in the non-actuated position wherein a ball 24 after having passed through the calibrating barrell and deposited from the calibrating barrel back into the ball return conduit 20 can pass downwardly past the launch mechanism and into the reduced diameter portion 22. When it is necessary to launch a ball into the barrel handle 154 is raised upwardly. By means of shaft 148 and arm 146 the plunger member 140 is moved downwardly, engaging an upper ball 24 and forcing all of the balls downwardly. FIG. 4 shows the process of launching a ball 124 in the intermediate position with the lowermost ball 24 almost launched into the barrel inlet 12. Further upward movement of lever arm 154 will move all of the ball 24 downwardly until the lowermost ball 24 is deposited into the barrel inlet for initiation of a calibrating cycle.

Since the arms 142 and 146 are of equal length, the plunger 140 remains in the position always substantially parallel the axis of the conduit 20.

After the launch of a ball 24 the lever arm 154 is lowered into the position of FIG. 5 wherein the launch mechanism remains until it is time to launch another ball to initiate a new calibrating cycle.

The various illustrated means of launching balls are all exemplary of various arrangements which may be devised in accordance with the practice of this invention. It is understood that other arrangements may be devised for practicing the invention.

What is claimed:

1. A calibrating barrel comprising:
  a barrel of uniform internal diameter having an inlet and an outlet;
  a ball return conduit communicating at one end with said barrel adjacent said inlet and at the other end with said barrel adjacent said outlet;
  a first and a second ball member each having a diameter substantially equal the interior diameter of said barrel and movably sealably through said barrel by fluid flow, said ball return conduit having a reduced internal diameter adjacent said barrel inlet snugly receiving said ball members;
  ball diverting means adjacent said barrel outlet whereby said balls passing through said barrel and said outlet are diverted into said ball return conduit, at least one of said balls being in sealing engagement with the interior of said return conduit at all times thereby preventing the flow of fluid through said ball return conduit;
  a cylinder having an open end communicating with said barrel at said outlet, the cylinder extending coaxially with said ball return conduit;
  a piston sealably slidable in said cylinder;
  a piston rod affixed to said piston and extending towards said ball return conduit;
  a packing bushing within said cylinder and adjacent said barrel, said packing bushing having an opening therein slidably receiving said piston rod; and
  means of moving said piston and thereby said piston rod longitudinally in said barrel, said piston rod extending within said ball return conduit to engage and force a said ball member into said barrel inlet, said means being one of hydraulic and pneumatic means, the flow of fluid through said barrel moving said ball sealably through said barrel to said outlet.

2. A calibrating barrel according to claim 1 including:
  first and second spaced apart detector switch means affixed to said barrel intermediate said barrel inlet and outlet, said switches being actuated by the passage of said balls therethrough to initiate and stop a calibration operation.

3. A calibrating barrel according to claim 2 wherein said barrel is in series with a flow meter and including:
  a pulse generator affixed to said flow meter to generate electrical pulses in proportion to the quantity of fluid flow therethrough;
  electric pulse counting means; and
  electric switch means in connection with said pulse generator, said pulse counting means and said detector switches whereby the count of the electric pulse output of said pulse generator by said counting means is initiated upon arrival of a said ball at said first signal means and terminated by the arrival of said ball of said second signal means.

4. A calibrating barrel according to claim 1 wherein said barrel is in series with a flow meter, including:
  first and second spaced apart detector means affixed to said barrel intermediate said barrel inlet and outlet, each of said switches comprising a detector and actuating means adapted to perform a control operation upon arrival of a said ball member thereat;
  means operable by said meter for continuously producing a driving force while fluid flows through said meter;
  a recording means adapted to be driven by said driving force; and
  means connecting said driving force to said recording means when a said ball member passes said first detector means and for disconnecting said driving force from said recording means when said ball member passes said second detector means.

5. A calibrating barrel according to claim 1 including:
  a third ball member of the same diameter as said first and second ball members wherein at least two of said ball members remain in said ball return conduit reduced diameter portion at all times;
  a small diameter opening in said ball return conduit reduced diameter portion at a point intermediate the position normally occupied by said balls; and
  a leak test valve closing said opening.

6. A calibrating barrel according to claim 1 wherein said barrel is arranged in a U-shaped configuration wherein said inlet and outlet are in close proximity and wherein said ball return conduit is of relatively short length compared to the length of said barrel.

7. A calibrating barrel according to claim 1 wherein said barrel is arranged, in a configuration providing two legs connected by a U-shaped intermediate portion, said inlet and outlet being in close proximity and wherein said legs and intermediate portion are in a vertical plane, said outlet lying above said inlet, and said ball return conduit being in the same vertical plane.

8. A calibrating barrel according to claim 1 wherein said ball diverting means includes at least one bar member extending across the interior diameter of said barrel adjacent to and downstream of said barrel outlet and said ball return conduit, said bar member permitting free flow of fluid therepast and prohibiting the passage of a said ball member.

References Cited

UNITED STATES PATENTS

| 2,948,143 | 8/1960 | Pruitt | 73—3 |
| 3,021,703 | 2/1962 | Pfrehm | 73—3 |
| 3,028,996 | 4/1962 | Ellett. | |
| 3,224,247 | 12/1965 | Barrett | 73—3 |
| 3,288,163 | 11/1966 | Craven. | |
| 3,397,570 | 8/1968 | Pfrehm | 73—3 |

LOUIS R. PRINCE, Primary Examiner

H. C. POST III, Assistant Examiner

U.S. Cl. X.R.

15—104.06